United States Patent
Okuyama et al.

(10) Patent No.: US 9,889,426 B2
(45) Date of Patent: Feb. 13, 2018

(54) HYGROSCOPIC PARTICLES

(71) Applicant: TOYO SEIKAN GROUP HOLDINGS, LTD., Tokyo (JP)

(72) Inventors: Shinpei Okuyama, Yokohama (JP); Yusuke Obu, Tokyo (JP); Shunya Nangou, Yokohama (JP); Naru Kawahara, Yokohama (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 0 days.

(21) Appl. No.: 15/311,961

(22) PCT Filed: May 18, 2015

(86) PCT No.: PCT/JP2015/064155
§ 371 (c)(1),
(2) Date: Nov. 17, 2016

(87) PCT Pub. No.: WO2015/178335
PCT Pub. Date: Nov. 26, 2015

(65) Prior Publication Data
US 2017/0120217 A1    May 4, 2017

(30) Foreign Application Priority Data

May 19, 2014 (JP) ................................. 2014-103529

(51) Int. Cl.
*B01D 53/28* (2006.01)
*B01J 20/26* (2006.01)
*B01J 20/28* (2006.01)

(52) U.S. Cl.
CPC ............ *B01J 20/267* (2013.01); *B01D 53/28* (2013.01); *B01J 20/28007* (2013.01)

(58) Field of Classification Search
CPC .... B01D 53/28; B01J 20/267; B01J 20/28007
USPC ......................................................... 502/402
See application file for complete search history.

(56) References Cited

U.S. PATENT DOCUMENTS

| | | |
|---|---|---|
| 2006/0047068 A1 | 3/2006 | Doane et al. |
| 2007/0049689 A1 | 3/2007 | Meyer et al. |
| 2007/0185292 A1 | 8/2007 | Nishida |
| 2010/0075844 A1 | 3/2010 | Loeker et al. |

FOREIGN PATENT DOCUMENTS

| | | |
|---|---|---|
| JP | 5-178919 A | 7/1993 |
| JP | 11-240959 A | 9/1999 |
| JP | 2007-132614 A | 5/2007 |
| JP | 2008-511726 A | 4/2008 |
| JP | 2009-506158 A | 2/2009 |
| JP | 2010-513576 A | 4/2010 |
| JP | 5190801 B2 | 4/2013 |
| JP | 5203604 B2 | 6/2013 |

OTHER PUBLICATIONS

International Search Report for PCT/JP2015/064155 dated Jul. 7, 2015 [PCT/ISA/210].

*Primary Examiner* — Edward Johnson
(74) *Attorney, Agent, or Firm* — Sughrue Mion, PLLC

(57) ABSTRACT

Hygroscopic particles including a crosslinked polymer containing 6.0 to 12.0 meq/g of carboxyl groups and 0.1 to 2.0 meq/g of sulfonic acid groups and/or sulfonate groups, 80% or more of the carboxyl groups being neutralized to a potassium salt.

4 Claims, No Drawings

HYGROSCOPIC PARTICLES

CROSS REFERENCE TO RELATED APPLICATIONS

This application is a National Stage of International Application No. PCT/JP2015/064155 filed May 18, 2015, claiming priority based on Japanese Patent Application No. 2014-103529 filed May 19, 2014, the contents of all of which are incorporated herein by reference in their entirety.

TECHNICAL FIELD

This invention relates to hygroscopic particles. More specifically, the invention relates to hygroscopic particles which have excellent hygroscopicity, show an excellent moisture absorption rate, achieve excellent moisture absorbing performance even under high temperature conditions, and are effectively prevented from desorbing moisture under high temperature conditions.

BACKGROUND ART

Various moisture absorbing agents have been proposed as measures for removing moisture in air. However, their properties such as moisture pickups, moisture absorption rates, and moisture absorption/desorption characteristics have both advantages and disadvantages, so that such moisture absorbing agents need to be selected depending on intended uses.

Lithium chloride and calcium chloride, for example, have the advantages of a great moisture pickup and a high moisture absorption rate, but are disadvantageous in that they deliquesce and thus liquefy after absorbing moisture. Moisture absorbing agents, such as silica gel and zeolite, have the advantage of being repeatedly usable because of their moisture adsorption/desorption properties. However, they are disadvantageous in that their moisture pickups are small, they require high temperatures for regeneration, they are apt to crush upon repeated moisture absorption/desorption, and their mixing with resins is difficult. Water absorbing resins typified by polyacrylic acid salts, moreover, are excellent in water absorbing performance, but are not fully satisfactory from the point of view of hygroscopicity.

Of various moisture absorbing agents, the following materials have been proposed as moisture absorbing agents having high moisture absorption properties and excellent in moisture absorption/desorption rate: One of them is a moisture absorbing/desorbing polymer comprising a vinyl polymer containing 1.0 to 8.0 meq/g of potassium carboxylate groups, and having a crosslinked structure obtained by copolymerization of divinylbenzene (Patent Document 1). The other material is moisture absorbing/desorbing ultrafine particles comprising a crosslinked polymer containing 1.0 to 10.0 meq/g of carboxylate groups and 0.1 to 2.0 meq/g of sulfonic acid groups and/or sulfonate groups as polar groups, the ultrafine particles having an average primary particle diameter of 0.1 µm or less, and saturated moisture absorption coefficients, at 20° C. and 65% RH and 90% RH, of 20% by weight or more and 40% by weight or more, respectively (Patent Document 2).

PRIOR ART DOCUMENTS

Patent Documents

Patent Document 1: Japanese Patent No. 5190801
Patent Document 2: Japanese Patent No. 5203604

SUMMARY OF THE INVENTION

Problems to be Solved by the Invention

The moisture absorbing/desorbing polymer or the moisture absorbing/desorbing ultrafine particles disclosed in the above-mentioned patent documents, however, has or have been still unsatisfactory for use in fields such as various electronic devices which have been developed and commercialized in recent years, for example, organic electroluminescent (organic EL) devices, solar cells, touch panels, and electronic paper.

That is, organic EL devices, etc. dislike leaks of charges, and high moisture barrier properties are required of plastic substrates for forming their circuit boards, or plastic substrates for films which seal their circuit boards. Thus, moisture absorbing agents as well as various barrier materials are used for the organic EL devices, etc. Since all these products are required to be durable under high temperature conditions, it is difficult to use the aforementioned moisture absorbing/desorbing polymer or moisture absorbing/desorbing ultrafine particles, which exhibit(s) high moisture desorbing performance under high temperature conditions, for products in the aforementioned fields.

An object of the present invention is, therefore, to provide hygroscopic particles which have excellent hygroscopicity, show an excellent moisture absorption rate, deliver excellent moisture absorbing performance even under high temperature conditions, and are effectively prevented from desorbing moisture under high temperature conditions.

Means for Solving the Problems

According to the present invention, there are provided hygroscopic particles including a crosslinked polymer containing 6.0 to 12.0 meq/g of carboxyl groups and 0.1 to 2.0 meq/g of sulfonic acid groups and/or sulfonate groups, wherein 80% or more of the carboxyl groups are neutralized to a potassium salt.

In the hygroscopic particles of the present invention, it is preferred that
1. the average primary particle diameter of the hygroscopic particles be 100 nm or less; and
2. the crosslinked polymer be formed by introducing potassium salt-type carboxyl groups via a hydrolysis reaction into a copolymer which contains a monomer providing a carboxyl group by hydrolysis, and divinylbenzene, as a monomer composition.

Effects of the Invention

The hygroscopic particles of the present invention can achieve excellent moisture absorbing performance even under high temperature conditions at 50° C. or higher, particularly at 70° C. or higher, and are effectively inhibited from desorbing moisture, once trapped, within a closed container. Even in a low humidity atmosphere, the hygroscopic particles have excellent moisture absorbing capability, and deliver very high moisture absorbing performance.

MODE FOR CARRYING OUT THE INVENTION

Hygroscopic Particles

The hygroscopic particles of the present invention are hygroscopic particles comprising a crosslinked polymer containing 6.0 to 12.0 meq/g of carboxyl groups and 0.1 to 2.0 meq/g of sulfonic acid groups and/or sulfonate groups, and their important characteristic is that 80% or more of the carboxyl groups are neutralized with a potassium salt.

In the present invention, the carboxyl groups, which are functional groups for exhibiting hygroscopicity, are in an amount of 6.0 to 12.0 meq/g, particularly 7.0 to 12.0 meq/g. Thus, excellent hygroscopicity and moisture absorption rate can be achieved. Moreover, 80% or more, particularly, 85% or more, of these carboxyl groups are neutralized with the potassium salt. Within the closed container, therefore, moisture absorption can take place, and moisture desorption can be suppressed, even under high temperature conditions at 50° C. or higher, particularly at 70° C. or higher.

That is, the moisture absorbing performance of the carboxyl groups of an alkali metal salt type including a monovalent alkali metal such as Li, Na, K, Rb or Cs is determined by the number of the moisture absorbing sites and Coulomb force representing the strength of interaction with water, and these parameters are relevant to the ionic radius of the metal. Thus, compared with other monovalent alkali metal salt-type carboxyl groups, potassium salt-type carboxyl groups have both of the number of the moisture absorbing sites and the strength of the interaction with water in a well-balanced manner, achieve excellent moisture absorbing performance, and enable humidity within the closed container to be set at 0% RH even under high temperature conditions.

In the present invention, moreover, such potassium salt-type carboxyl groups are present in an amount of 80% or more, particularly 85% or more, of all the carboxyl groups. Thus, the moisture absorbing performance under high temperature conditions is markedly improved. From the point of view of hygroscopicity, it is preferred that the amount of neutralization be as large as possible.

It is also important for the copolymer constituting the hygroscopic particles of the present invention to contain, along with the above potassium salt-type carboxyl groups, 0.1 to 2.0 meq/g of sulfonic acid groups and/or sulfonate groups. By containing the sulfonic acid groups and/or sulfonate groups in the above range, it becomes possible to obtain highly hygroscopic fine particles stably and with good dispersibility. If the amount of the sulfonic acid groups and/or sulfonate groups is smaller than the above range, it is impossible to obtain fine particles stably. If this amount is larger than the above range, on the other hand, the amount of the potassium salt-type carboxyl groups showing high hygroscopicity becomes relatively small, arousing the possibility of decline in the moisture absorbing performance.

The above-mentioned actions and effects of the hygroscopic particles of the present invention will become apparent from the results of Examples to be described later.

That is, if the amount of neutralization with the potassium salt is less than 80% even when the amount of the carboxyl groups and the amount of the sulfonic acid groups and/or the sulfonate groups are within the aforesaid ranges, the ultimate humidity within the closed container at 50° C. is 6.0% RH and the ultimate humidity within the closed container at 70° C. is 6.8% RH (Comparative Example 3), whereas the ultimate humidity within the closed container at 50° C. is 0% RH and the ultimate humidity within the closed container at 70° C. is 0% RH in the case of the hygroscopic particles of the present invention, demonstrating the marked superiority of moisture absorbing performance (Examples 1 to 3). If the salt type of the carboxyl groups is not a potassium salt even when the amount of the carboxyl groups, the neutralization rate of the carboxyl groups, and the amount of the sulfonic acid groups and/or the sulfonate groups are within the aforesaid ranges, the ultimate humidity within the closed container at 50° C. is 0.2% RH and the ultimate humidity within the closed container at 70° C. is 0.6% RH, showing that moisture desorption in a high temperature environment cannot be suppressed (Comparative Example 1).

Furthermore, if the amount of the carboxyl groups is less than 6.0 meq/g even when the amount of the sulfonic acid groups and/or the sulfonate groups and the neutralization rate are within the aforesaid ranges, sufficient moisture absorbing ability cannot be secured regardless of the temperature conditions. If the amount of the carboxyl groups is more than 12.0 meq/g, crosslinking of the hygroscopic particles is so insufficient that the agglomeration of the particles occurs and the moisture absorption rate slows. Besides, if the amount of the sulfonic acid groups and/or the sulfonate groups is less than 0.1 meq/g even when the amount of the carboxyl groups and the neutralization rate are within the aforesaid ranges, hygroscopic particles cannot be formed stably. If the amount of the sulfonic acid groups and/or the sulfonate groups is more than 2.0 meq/g, the amount of the potassium salt-type carboxyl groups showing high hygroscopicity becomes relatively small, thus deteriorating the moisture absorbing performance.

As the hygroscopic particles of the present invention, spherical fine particles with an average primary particle diameter (average primary particle diameter $D_{50}$ on a volume basis as measured by the laser diffraction/scattering method) of 100 nm or less, particularly 80 nm or less, are particularly preferred. Since the average primary particle diameter is 100 nm or less, a large specific surface area is obtained, thus making the amount of surface adsorption great. In addition, the time of movement of water molecules to the center of the particles is short, and a region as far as the center of the particles can contribute to moisture absorption, thus making it possible to show high hygroscopicity. When the particles are incorporated into a matrix, moreover, their dispersibility in the matrix is very satisfactory, so that the particles can be uniformly dispersed in the matrix. Furthermore, the fine particles of such a nature do not spoil the transparency of the matrix, but can be used preferably for uses such as organic EL devices.

Preparation of Hygroscopic Particles

As described above, the hygroscopic particles of the present invention comprise a crosslinked polymer containing 6.0 to 12.0 meq/g of carboxyl groups and 0.1 to 2.0 meq/g of sulfonic acid groups and/or sulfonate groups, 80% or more of the carboxyl groups being neutralized with a potassium salt, the potassium salt-type carboxyl groups being contained in an amount of 4.8 meq/g or more, particularly, 5.6 meq/g or more.

A method for introducing the potassium salt-type carboxyl groups can be, but not limited to, (i) a method which comprises either homopolymerizing a monomer having potassium salt-type carboxyl groups, or copolymerizing the monomer with other copolymerizable monomer, to obtain a polymer; (ii) a method which comprises obtaining a polymer having carboxyl groups, and then converting the carboxyl groups into potassium salt-type carboxyl groups; (iii) a method which comprises introducing carboxyl groups by chemical modification, and converting the carboxyl groups into potassium salt-type carboxyl groups; or (iv) a method of performing any of the above methods (i) to (iii) by graft polymerization.

The method (i) of polymerizing a monomer having potassium salt-type carboxyl groups to introduce the potassium salt-type carboxyl groups is, for example, the homopolymerization of a potassium salt-type form of a vinyl-based monomer containing a carboxyl group, such as acrylic acid, methacrylic acid, maleic acid, itaconic acid, or vinyl propionate; or copolymerization involving two or more of the monomers; or copolymerization of these monomers with other copolymerizable monomers.

The method (ii) of obtaining a polymer having carboxyl groups, followed by changing the polymer to a potassium salt type can be such that if a vinyl monomer containing a carboxyl group is an acid type monomer or a monomer of a salt type other than a potassium salt type, this monomer is converted into a homopolymer or a copolymer by a method similar to the above method, whereafter the resulting polymer is changed into a potassium salt type by ion exchange with potassium ions. The method of changing the carboxyl groups to a salt type is not limited, but can be performed, for example, by allowing a solution containing a large amount of potassium ions, such as an aqueous solution of potassium hydroxide or an aqueous solution of potassium chloride, to act on the carboxyl groups for ion exchange.

The method (iii) of introducing carboxyl groups by chemical modification includes, for example, a method of polymerizing a homopolymer of a monomer having a functional group which can be modified into a carboxyl group by chemical modification treatment, or a copolymer of two or more of such monomers, or a copolymer of such a monomer with another copolymerizable monomer, and modifying the resulting polymer by hydrolysis to have carboxyl groups. If the resulting carboxyl groups are not of a potassium salt type, any of the above-mentioned methods for conversion into a potassium salt type is applied to the carboxyl groups formed by modification. The present invention can preferably use, in particular, the method of introducing carboxyl groups into a polymer by hydrolysis treatment, followed by ion exchange to change the carboxyl group into a potassium salt type.

Examples of the monomer for which the above method can be adopted are monomers having a cyano group, such as acrylonitrile and methacrylonitrile; and derivatives of acrylic acid, methacrylic acid, maleic acid, itaconic acid, and vinyl propionate, for example, ester compounds such as methyl (meth)acrylate, ethyl (meth)acrylate, normal-propyl (meth)acrylate, isopropyl (meth)acrylate, n-butyl (meth) acrylate, n-octyl (meth)acrylate, 2-ethylhexyl (meth)acrylate, and hydroxyethyl (meth)acrylate, anhydrides such as maleic anhydride and itaconic anhydride, and amide compounds such as (meth)acrylamide, dimethyl (meth)acrylamide, monoethyl (meth)acrylamide, and normal-t-butyl (meth) acrylamide.

There is no particular limitation on the method of introducing salt-type carboxyl groups by the hydrolysis reaction of the polymer, and known hydrolysis conditions can be utilized. Examples include a method of introducing potassium salt-type carboxyl groups into a copolymer, which has been prepared by polymerization of the monomer, with the use of a basic aqueous solution, for example, an aqueous solution of potassium hydroxide; a method of introducing salt-type carboxyl groups with the use of a different basic aqueous solution such as an aqueous solution of sodium hydroxide or lithium hydroxide, and then mixing the system with a solution containing a large amount of potassium ions, such as a solution of potassium hydroxide or potassium chloride, or subjecting the system to the action of an ion exchange resin, thereby performing ion exchange to introduce potassium salt-type carboxyl groups; and a method of reacting the polymer with a mineral acid such as nitric acid, sulfuric acid, or hydrochloric acid, or an organic acid such as formic acid or acetic acid, to form carboxylic acid groups, then performing ion exchange by the same method as mentioned above, thereby introducing potassium salt-type carboxyl groups.

The conditions for neutralizing 80% or more of all carboxyl groups with a potassium salt are determined by a combination of conditions such as the type or concentration of the monomer or potassium compound to be used, the temperature of the reaction, and the duration of the reaction, and cannot be unconditionally defined. If a copolymer comprising acrylonitrile and divinylbenzene is used as a carboxyl group-containing crosslinked copolymer, and potassium hydroxide is used for hydrolysis, for example, it is preferred to perform the reaction for 24 to 48 hours at a reaction temperature of 90 to 96° C.

For the hygroscopic particles of the present invention, a high moisture absorption rate should be attained, a volume change due to swelling during moisture absorption should be suppressed, and shape stability should be maintained. From these points of view, it is desirable for the hygroscopic particles to be composed of a crosslinked polymer having a crosslinked structure. How to introduce the crosslinked structure is not particularly limited, but a preferred method of introduction is as follows: a method of using a crosslinkable monomer at a polymerization stage using a monomer; or a method of performing chemical post-crosslinking after obtaining a polymer. With such a method, a strong crosslinked structure ascribed to a covalent bond can be introduced, and crosslinked particles refractory to physical or chemical modification are obtained.

According to the method using a crosslinkable monomer at the monomer polymerization stage, the aforementioned monomer having carboxyl groups or modifiable to have carboxyl groups is copolymerized with a crosslinkable vinyl compound to be mentioned below, whereby a crosslinked polymer having a crosslinked structure based on a covalent bond can be obtained.

Examples of the crosslinkable monomer usable in the method using a crosslinkable monomer at the monomer polymerization stage include crosslinkable vinyl compounds such as glycidyl methacrylate, N-methylolacrylamide, triallyl isocyanurate, triallyl cyanurate, divinylbenzene, hydroxyethyl methacrylate, diethylene glycol di(meth)acrylate, triethylene glycol di(meth)acrylate, trimethylolpropane tri(meth)acrylate, and methylenebisacrylamide. Crosslinked structures ascribed to divinylbenzene, triallyl isocyanurate, triallyl cyanurate, and methylenebisacrylamide, in particular, are desirable, because they are chemically stable even during hydrolysis or the like which is applied to the crosslinked polymer containing any of them for introducing carboxyl groups.

Nor is there particular restriction on the method relying on post-crosslinking. An example of the method is a post-crosslinking method in which nitrile groups contained in a nitrile-based polymer having a nitrile group-containing vinyl monomer content of 50% by weight or more are reacted with a hydrazine compound or formaldehyde. The method using the hydrazine compound, in particular, is stable to an acid and an alkali, and a crosslinked structure formed by this method is itself so hydrophilic that it can contribute to an improvement in hygroscopicity. Moreover, it becomes possible to introduce a firm crosslink capable of retaining a form imparted to the polymer, such as a porous form. In these respects, this method is extremely good.

The vinyl monomer having a nitrile group is not particularly limited, and its examples include acrylonitrile, methacrylonitrile, ethacrylonitrile, α-chloroacrylonitrile, α-fluoroacrylonitrile, and vinylidene cyanide. Of them, acrylonitrile having a high nitrile group content per unit weight and excellent in economy is the most preferred.

The method of introducing a crosslink by reaction with a hydrazine compound is not particularly limited, as long as it obtains a desired crosslinked structure. Any appropriate method can be selected, where necessary, for example, depending on the concentrations of the acrylonitrile polymer and the hydrazine compound during reaction, the type of a solvent used, the reaction time, or the reaction temperature. Examples of the usable hydrazine compound include salts of hydrazine such as hydrazine hydrate, hydrazine sulfate, hydrazine hydrochloride, hydrazine nitrate, hydrazine monohydrobromide, and hydrazine carbonate; and hydrazine derivatives such as ethylenediamine, guanidine sulfate, guanidine hydrochloride, guanidine nitrate, guanidine phosphate, and melamine.

The hygroscopic particles of the present invention have sulfonic acid groups and/or sulfonate groups as well as potassium salt-type carboxyl groups, as stated earlier. Since the sulfonic acid groups and/or sulfonate groups are contained, hygroscopic particles can be obtained stably in an aqueous system, and the groups contained are hydrophilic groups, thus making the resulting particles excellent in hygroscopicity. The sulfonic acid groups and/or sulfonate groups described in the present invention include a mono-substituted sulfuric ester and its salt (—O—SO$_3$H (or M: salt).

For the sulfonate groups, any substances forming a salt structure together with sulfonic acid groups may be used without limitation. Examples include alkali metals such as Li, Na, K, Rb and Cs; alkaline earth metals such as Be, Mg, Ca, Sr and Ba; other metals such as Cu, Zn, Al, Mn, Ag, Fe, Co and Ni; and organic cations such as NH$_4^+$ and amine compounds. Of them, potassium salt-type substances which can coexist with potassium salt-type carboxyl groups particularly effective for an increase in the absorption/desorption rate are more preferred. Also, two or more of the above-mentioned salts can be used at the same time.

The method of introducing the sulfonic acid groups and/or sulfonate groups is not particularly limited. Its examples include a method of copolymerizing a monomer having sulfonic acid groups and/or sulfonate groups; a method of introducing sulfonic acid groups and/or sulfonate groups into the end of a polymer by use of an initiator or a chain transfer agent; and a method of using a reactive emulsifying agent having sulfonic acid groups and/or sulfonate groups, and performing polymerization, thereby introducing the sulfonic acid groups and/or sulfonate groups into a polymer.

Examples of the monomer usable in the method of copolymerizing a monomer having sulfonic acid groups and/or sulfonate groups include vinylsulfonic acid (salt), (meth)allylsulfonic acid (salt), styrenesulfonic acid (salt), 4-sulfobutyl (meth)acrylate and its salt, methallyloxybenzenesulfonic acid (salt), allyloxybenzenesulfonic acid (salt), 2-acrylamido-2-methylpropanesulfonic acid (salt), and 2-sulfoethyl (meth) acrylate.

There can also be mentioned, for example, the method of introducing sulfonic acid groups and/or sulfonate groups as an initiator terminal with the use of an initiator capable of producing sulfonic and/or salt-type sulfonic radicals. Examples of the initiator include heat-decomposable persulfates such as ammonium persulfate and potassium persulfate; and redox type initiators exemplified by initiators as any such combinations of the following oxidizing agents and reducing agents as to be capable of generating sulfonic acid (salt) radicals: the oxidizing agents including persulfates, perchlorates, silver salts, copper salts, and iron (III) salts, and the reducing agents including sulfites, hydrogensulfites, hyposulfites, pyrosulfites, triethanolamine, and iron (II) salts. The chain transfer agent can be exemplified by thioglycolsulfonic acid (salt).

In the method of using a reactive emulsifying agent having sulfonic acid groups and/or sulfonate groups, the usable reactive emulsifying agent is not particularly limited. Its examples include 4-nonyl-2-(1-propenyl)phenoxypolyethoxyethylsulfonic acid and salts thereof, alkyl sulfo(salt) succinic acid alkenyl esters, alkyl sulfo(salt)succinic acid allyloxy-(hydroxyl) propylesters, and alkyl sulfo(salt)phenoxy-(hydroxy) propyl(meth)acrylic acid esters.

As long as the hygroscopic particles of the present invention have the carboxyl groups, potassium salt-type carboxylic acid groups, sulfonic acid groups and/or sulfonate groups, they can contain carboxylic acid groups of a salt type other than a potassium salt type, or can contain polar groups such as amino groups, phosphate groups, salt-type phosphate groups, hydroxyl groups, nitro groups, aldehyde groups, amide groups, nitrile groups, and mercapto groups.

Polymerization methods, which can be adopted to obtain the hygroscopic particles of the present invention, include, for example, publicly known methods of polymerization capable of forming fine particles, such as emulsion polymerization, precipitation polymerization, and microemulsion polymerization, although these methods are not limitative. The manner of polymerization may be normal phase polymerization or reverse phase polymerization.

Of them, emulsion polymerization is preferred, because it provides a wide range of choices, such as the types and amounts of the emulsifying agent and the initiator, and can obtain more diverse particulate polymers.

The method by reverse phase polymerization, on the other hand, is advantageous in that it can simplify the process, because it can obtain hygroscopic particles by directly polymerizing the aforementioned monomer having carboxyl groups. An alternative method is to use a monomer having functional groups capable of introducing carboxyl groups by hydrolysis, polymerize the monomer by a normal phase polymerization process to form particles, and hydrolyze the resulting polymer to introduce therein salt-type carboxyl groups. This method is advantageous in that it is easy to handle because of its use of water as a solvent and is environmentally friendly.

The hygroscopic particles of the present invention are produced particularly preferably by a method which comprises forming a crosslinked polymer with the use of a monomer providing a carboxyl group by hydrolysis, such as methyl (meth)acrylate, a crosslinkable monomer copolymerizable with this monomer, such as divinylbenzene, and a monomer capable of introducing a sulfonic acid group and/or a sulfonate group, and hydrolyzing the crosslinked polymer with the use of potassium hydroxide, thereby preparing potassium salt-type carboxyl group-containing crosslinked polymer particles; a method which comprises forming the above crosslinked polymer, then converting the carboxyl groups into salt-type carboxyl groups by use of other base such as sodium hydroxide, then mixing the polymer with a solution containing a large amount of potassium ions such as potassium chloride, or allowing an ion exchange resin to act on the polymer, for ion exchange, thereby introducing potassium salt-type carboxyl groups; or a method which comprises reacting the polymer with a mineral acid such as hydrochloric acid to form carboxylic acid groups, and then performing ion exchange by the same method as mentioned above, to prepare crosslinked polymer particles having potassium salt-type carboxyl groups.

As a crosslinked copolymer containing carboxyl groups, sulfonic acid groups and/or sulfonate groups in the aforementioned ranges, crosslinked sodium polyacrylate fine particles (average particle diameter: about 70 nm) are marketed in the form of a colloidal dispersion (pH=10.4) by Toyobo Co., Ltd. under the trade name of TAFTIC HU-820E. The crosslinked sodium polyacrylate fine particles are subjected to ion exchange by the above-mentioned method, whereby crosslinked polymer particles having potassium salt-type carboxyl groups can be prepared.

EXAMPLES

The excellent performance of the hygroscopic particles of the present invention will be explained by the following experimental examples:

Quantitative Determination of Carboxyl Groups

Using an ion exchange resin (Amberlite 200CT, produced by ORGANO CORPORATION), sodium salt-type carboxyl groups of a sodium polyacrylate crosslinked product (TAFTIC HU-820E, Toyobo Co., Ltd., water dispersed product, solids content 13% by weight, average particle diameter $D_{50}$: 70 nm) were converted into carboxylic acid groups to obtain a hydrogen polyacrylate crosslinked product having carboxylic acid groups (water dispersed product, solids content 13% by weight, average particle diameter $D_{50}$: 62 nm).

The above hydrogen polyacrylate crosslinked product (1.0 g) having carboxylic acid groups after being fully dried was precisely weighed (X (g)), and 200 ml of water was added. Then, a titration curve was prepared by a conventional procedure using a 0.1N aqueous solution of sodium hydroxide. From the titration curve, the amount of consumption (Y (ml)) of the sodium hydroxide aqueous solution consumed by the carboxyl groups was found, and the amount of the carboxyl groups contained in the sample was calculated from the following equation:

(Amount of carboxyl groups meq/g)=0.1Y/X

Quantitative Determination of Sulfonic Acid Groups

The hydrogen polyacrylate crosslinked product was quantitatively measured for the sulfur concentration by combustion ion chromatography, and the amount of the sulfonic acid groups was calculated from the results.

Evaluation of Ultimate Humidity

The ultimate humidity of the hygroscopic particles was measured by the following method:
The hygroscopic particles were dried for 1 hour at 140° C., and then 0.5 g of the sample and a wireless thermohygrometer (Hygrochron, produced by KN Laboratories, Inc.) were placed in a moisture-impermeable steel foil laminated cup having an internal volume of 85 cm$^3$ in an atmosphere at 30° C. and 80% RH. The mouth of the container was heat-sealed with an aluminum foil laminated film lid, and the container was allowed to stand for a day. Then, the container was allowed to stand for 3 hours at each of temperatures of 30, 50 and 70° C. The relative humidity within the container on each of these occasions was taken as the ultimate humidity at each of the temperatures.

Example 1

The aforementioned hydrogen polyacrylate crosslinked product was neutralized at a rate of 80% with the use of a 1N aqueous solution of potassium hydroxide to obtain hygroscopic particles of potassium polyacrylate having potassium salt-type carboxyl groups (water dispersed product, solids content 10% by weight, average particle diameter $D_{50}$: 70 nm, neutralization rate 80%).

Example 2

Hygroscopic particles of potassium polyacrylate were obtained in the same manner as in Example 1, except that the neutralization rate of the potassium polyacrylate crosslinked product having potassium salt-type carboxyl groups was set at 100% in Example 1.

Example 3

An autoclave of a 2000 ml container was charged with 400 parts by weight of acrylonitrile, 40 parts by weight of methyl acrylate, 100 parts by weight of divinylbenzene, 26 parts by weight of sodium p-styrenesulfonate, and 1181 parts by weight of water. Further, di-tert-butylperoxide was added as a polymerization initiator in an amount of 0.5% by weight based on the total weight of the monomers. Then, the autoclave was closed, and the system was polymerized for 10 minutes at a temperature of 160° C. with stirring. After completion of the reaction, the system was cooled to room temperature, with stirring being continued. Then, the polymerized product was withdrawn from the autoclave to obtain an emulsion-form polyacrylonitrile polymer having a fine particle diameter.

To 165 parts by weight of the resulting emulsion-form polyacrylonitrile-based crosslinked polymer, 45 parts by weight of potassium hydroxide and 590 parts by weight of water were added. The mixture was reacted for 36 hours at 95° C. to hydrolyze nitrile groups and methyl ester groups, thereby converting them into carboxylic acid groups. The resulting hydrolyzate solution was placed in a cellulose semipermeable membrane, and immersed in deionized water for demineralization, whereby hygroscopic particles of potassium polyacrylate having potassium salt-type carboxyl groups (water dispersed product, solids content 14% by weight, average particle diameter $D_{50}$: 80 nm, neutralization rate 93%) were obtained.

Comparative Example 1

Hygroscopic particles of sodium polyacrylate were obtained in the same manner as in Example 1, except that a 1N aqueous solution of sodium hydroxide was used instead of the iN aqueous solution of potassium hydroxide in Example 1.

Comparative Example 2

Hygroscopic particles of lithium polyacrylate were obtained in the same manner as in Example 1, except that a 1N aqueous solution of lithium hydroxide was used instead of the 1N aqueous solution of potassium hydroxide in Example 1.

Comparative Example 3

Hygroscopic particles of potassium polyacrylate were obtained in the same manner as in Example 1, except that the neutralization rate of the potassium polyacrylate crosslinked product was set at 23% in Example 1.

Evaluation Tests

The hygroscopic particles prepared as above were measured for various properties by the aforementioned methods. The results are shown in Table 1.

TABLE 1

| | Amount of all carboxyl groups (meq/g) | Amount of sulfonic acid groups (meq/g) | Salt type | Neut. rate (%) | Amount of carboxylate groups (meq/g) | Average particle diameter (nm) | Ultimate humidity (30° C.) (% RH) | Ultimate humidity (50° C.) (% RH) | Ultimate humidity (70° C.) (% RH) |
|---|---|---|---|---|---|---|---|---|---|
| Ex. 1 | 7.5 | 0.12 | K | 80 | 6.0 | 75 | 0.0 | 0.0 | 0.0 |
| Ex. 2 | 7.5 | 0.12 | K | 100 | 7.5 | 75 | 0.0 | 0.0 | 0.0 |
| Ex. 3 | 8.5 | 0.13 | K | 93 | 7.9 | 80 | 0.0 | 0.0 | 0.0 |
| Comp. Ex. 1 | 7.5 | 0.12 | Na | 80 | 6.0 | 70 | 0.0 | 0.2 | 0.6 |
| Comp. Ex. 2 | 7.5 | 0.12 | Li | 80 | 6.0 | 68 | 0.0 | 1.7 | 2.0 |
| Comp. Ex. 3 | 7.5 | 0.12 | K | 23 | 1.7 | 65 | 5.6 | 6.0 | 6.8 |

Neut. rate: Neutralization rate

INDUSTRIAL APPLICABILITY

The hygroscopic particles of the present invention can exhibit excellent moisture absorbing performance even under high temperature conditions at 50° C. or above, and are excellent in dispersibility and transparency when incorporated into a matrix. Thus, they can be effectively used, for example, for a barrier film which is used in an electronic device, such as an organic EL panel required to be durable to high temperatures.

The invention claimed is:

1. Hygroscopic particles including a crosslinked polymer containing 6.0 to 12.0 meq/g of carboxyl groups and 0.1 to 2.0 meq/g of sulfonic acid groups and/or sulfonate groups, wherein 80% or more of the carboxyl groups are neutralized to a potassium salt, and an ultimate humidity in a closed container containing the hygroscopic particles at 50° C. is 0% RH.

2. The hygroscopic particles according to claim 1, which have an average primary particle diameter of 100 nm or less.

3. The hygroscopic particles according to claim 1, which have potassium salt-type carboxyl groups introduced via a hydrolysis reaction into a copolymer containing a monomer providing a carboxyl group by hydrolysis, and divinylbenzene, as a monomer composition.

4. The hygroscopic particles according to claim 2, which have potassium salt-type carboxyl groups introduced via a hydrolysis reaction into a copolymer containing a monomer providing a carboxyl group by hydrolysis, and divinylbenzene, as a monomer composition.

* * * * *